(12) United States Patent
Exertier et al.

(10) Patent No.: US 11,347,481 B2
(45) Date of Patent: May 31, 2022

(54) SUPPORT SYSTEM FOR DESIGNING AN ARTIFICIAL INTELLIGENCE APPLICATION, EXECUTABLE ON DISTRIBUTED COMPUTING PLATFORMS

(71) Applicant: BULL SAS, Les Clayes-sous-Bois (FR)

(72) Inventors: François Exertier, Saint-Martin-D'Uriage (FR); Mathis Gavillon, Le Versoud (FR)

(73) Assignee: BULL SAS, Les Clayes-sous-Bois (FR)

( * ) Notice: Subject to any disclaimer, the term of this patent is extended or adjusted under 35 U.S.C. 154(b) by 37 days.

(21) Appl. No.: 17/004,295

(22) Filed: Aug. 27, 2020

(65) Prior Publication Data

US 2021/0064346 A1     Mar. 4, 2021

(30) Foreign Application Priority Data

Aug. 30, 2019  (EP) ..................................... 19194722
Dec. 19, 2019  (FR) ..................................... 1915004

(51) Int. Cl.
  *G06F 9/44* (2018.01)
  *G06F 8/20* (2018.01)
  (Continued)

(52) U.S. Cl.
  CPC .............. *G06F 8/20* (2013.01); *G06F 3/0486* (2013.01); *G06F 8/60* (2013.01); *G06F 8/77* (2013.01);
  (Continued)

(58) Field of Classification Search
  CPC .. G06F 40/186; G06F 9/5077; G06F 16/2255; G06F 8/20; G06F 3/0486; G06F 8/60; G06F 8/77; G06F 9/45558; H04L 41/5025; H04L 41/5048; G06Q 10/0637; G06Q 30/06; G06Q 10/06395;
  (Continued)

(56) References Cited

U.S. PATENT DOCUMENTS

2012/0147894 A1* 6/2012 Mulligan ............ H04L 41/5048
                                                          370/395.53
2018/0136912 A1* 5/2018 Venkataramani .... G06N 3/0454
(Continued)

FOREIGN PATENT DOCUMENTS

WO    2014058411 A1    4/2014
WO    2018122540 A1    7/2018

OTHER PUBLICATIONS

"Ystia Suite: Ystia Orchestrator 3.0.0 released", 2018, p. 1-5—see: https://ystia.github.io/2018/07/14/yorc-3-0-0.html <YstiaSuite.pdf>.*
(Continued)

*Primary Examiner* — Tuan A Vu
(74) *Attorney, Agent, or Firm* — Meagher Emanuel Laks Goldberg & Liao, LLP (57) ABSTRACT

The present invention relates to a learning engine function and the use thereof in a system using a suite of modular and clearly structured Artificial Intelligence application design tools (SOACAIA), executable on distributed or undistributed computing platforms to browse, develop, make available and manage AI applications, this set of tools implementing four functions:

A Studio function;
A Forge function;
An Orchestrator function;
A fast machine learning engine FMLE (FastML Engine) function.

62 Claims, 2 Drawing Sheets

(51) Int. Cl.
*G06Q 10/10* (2012.01)
*G06Q 30/00* (2012.01)
*G06F 3/0486* (2013.01)
*G06N 20/00* (2019.01)
*G06F 9/455* (2018.01)
*G06F 8/77* (2018.01)
*G06F 8/60* (2018.01)
*G06Q 10/06* (2012.01)

(52) U.S. Cl.
CPC ......... *G06F 9/45558* (2013.01); *G06N 20/00* (2019.01); *G06Q 10/06395* (2013.01); *G06Q 10/101* (2013.01); *G06Q 10/103* (2013.01); *G06Q 10/105* (2013.01); *G06Q 30/0185* (2013.01)

(58) Field of Classification Search
CPC .. G06Q 10/101; G06Q 10/103; G06Q 10/105; G06Q 30/0185; G06N 20/00; G06N 3/0454
See application file for complete search history.

(56) References Cited

U.S. PATENT DOCUMENTS

| | | | |
|---|---|---|---|
| 2018/0243800 A1* | 8/2018 | Kumar | G06N 20/00 |
| 2018/0284737 A1* | 10/2018 | Cella | G06Q 30/06 |
| 2019/0104182 A1* | 4/2019 | Elzur | H04L 41/5025 |
| 2019/0109756 A1* | 4/2019 | Abu Lebdeh | G06F 9/5077 |
| 2019/0121847 A1* | 4/2019 | Castaneda-Villagran | G06F 40/186 |
| 2019/0121889 A1* | 4/2019 | Gold | G06F 16/2255 |
| 2019/0378074 A1* | 12/2019 | McPhatter | G06Q 10/0637 |

OTHER PUBLICATIONS

European Search Report issued in corresponding European Patent Application No. 20192279.6, dated Jan. 22, 2021, pp. 1-13, European Patent Office, Munich, Germany.

* cited by examiner

SUPPORT SYSTEM FOR DESIGNING AN ARTIFICIAL INTELLIGENCE APPLICATION, EXECUTABLE ON DISTRIBUTED COMPUTING PLATFORMS

TECHNICAL FIELD AND SUBJECT MATTER OF THE INVENTION

The present invention relates to the field of artificial intelligence (AI) applications on computing platforms.

PRIOR ART

According to the prior art, during the phase of deployment of an artificial intelligence application, the designer or the user perform tasks ([FIG. 1]) of development, fine-tuning and deployment of models.

Performing these tasks has disadvantages, in particular since it does not enable these users to focus on their main activity. By virtue of a software of orchestrator type, making it possible to automate the roll-out of a certain number of processes, the quality of the work of said designers/users can be improved. Patent applications FR1663536 and FR1763239 specifically relate to the use of orchestration for assigning resources and propose algorithms in order to automatically determine on which infrastructure applications should be deployed.

The invention therefore aims to overcome at least one of these disadvantages by proposing to users (the Data Scientist, for example) an original combination of modules giving a device which automates part of the conventional process for developing machine learning (ML) models, and also the method for using same.

GENERAL PRESENTATION OF THE INVENTION

The object of the present invention therefore is to overcome at least one of the disadvantages of the prior art by proposing a device and a method which simplify the creation and the use of artificial intelligence applications.

In order to achieve this result, the present invention relates to a system using a suite of modular and clearly structured Artificial Intelligence Application Design Tools (SOACAIA), executable on distributed computing platforms to browse, develop, make available and manage AI applications, this set of tools implementing four functions:

A Studio function making it possible to establish a secure and private shared space for the company wherein the extended team of business analysts, data scientists, application architects and IT managers can communicate and work together collaboratively;

A Forge function making it possible to industrialize AI instances and to make the analytical models and their associated datasets available, via a catalog, to the development teams, subject to compliance with security and processing conformity conditions;

An Orchestrator function for managing the total implementation of the AI instances designed by the STUDIO function and industrialized by the Forge function and to carry out permanent management on a hybrid cloud infrastructure;

A Fast Machine Learning Engine FMLE (FastML Engine) function, which is a machine learning toolbox for high-performance computers HPC and hybrid infrastructures, facilitating the use of computing power and the possibilities of high-performance computing clusters as execution support for machine learning training models and specifically deep learning training models.

According to one particular feature, the fast machine learning engine (FastMLE) function comprises an interface, the aim of which is, during its execution on a platform, to facilitate the phase of designing and fine-tuning Machine Learning Models; when a first draft of this model is produced; it is then advisable to train it on one or more annotated dataset(s) and to fine-tune the model; in order to train their model, the "data scientist" user must use at least one dataset file comprising annotated data, the FastMLE module makes it possible to manage the existing annotated and ready-to-use dataset files; by virtue of this API or of this interface, the "data scientist" can select one or more dataset files and load them onto the infrastructure where the training of their model is to be executed, or save them in at least one database operated by FastMLE.

According to a variant of the invention, the fast machine learning engine function comprises an interface enabling the user:

To choose in a menu to create at least one "experiment" EX1, triggering a menu making it possible to associate the code of a model M1, either defined by the user or from the different models Mi stored in memory by the service, with a launch script SLi and with an ML FML j framework (for example Tensorflow, etc.), depending on their choices to create an association (for example, EX1, M1, SLi, FMLj or EX2, Mi, SLi2 FMJ3) each of which is stored in memory in the FastMLE metadatabase and which will make it possible to create a respective container (EX1, EX2) when a training is launched To choose in another menu to create and launch a "training" E1 to be executed on their model, by associating an experiment EXk chosen from the experiments previously created for example via the first step, of the Forge catalog, with a dataset DSm (previously loaded on the infrastructure via FastMLE), and optionally with hyperparameters depending on the user's choices, the association EXk, DSm being materialized by a container, the information of the association being stored in memory in the FastMLE metadata.

Thus, the training is materialized by the model which is executed within a container created at the time the training is launched, based on information specific to the experiment and information provided at the time the training is created. The container is what will be deployed on the nodes of the execution infrastructure and provides all the libraries required for its execution and will incorporate annotated data (dataset) and parameters (hyperparameters) such that the model learns later to predict events on non-annotated datasets.

According to another variant, the fast machine learning engine function enables a container to be executed on a high-performance cluster having CPU, RAM, GPU resources as mentioned by the "data scientist" in the use of FastMLE at the time the training is created (second step).

According to another variant, the fast machine learning engine function contains another FastMLE interface which enables the user to supervise the training thereof, monitor the evolution thereof (initialization, ongoing, ended, etc.) and monitor the training.

According to another variant, the FMLE engine requires:
A scheduler which manages all the resources on the group of machines to make it possible to allocate resources to one or more jobs (for example a training which will be materialized as job(s));

A container management system used to support the machine learning (ML/DL) experiments and thus secure the execution thereof, in order that they are only accessible by the user or group or company;

A warehouse to save the container images of the deep learning environments (frameworks) which are used to launch the experiments EX;

An NFS distributed file system for sharing the dataset files between the machine learning (ML/DL) experiments.

According to another variant, the fast machine learning engine function associated in a system, preferably the system (SOACAIA) described above, using the functionalities of the orchestrator (of Yorc type for example), will make it possible to generate at least one HPC job to enable the execution of each training of each model.

Thus, the association of FastMLE and Yorc (used by FastMLE) makes it possible to conceal from the user complex jobs which would have consisted in defining their execution program, allocating the resources required for the execution, deploying the training thereon and launching the program, etc.

According to one variant, the AI applications are made independent of the support infrastructures by the TOSCA-based orchestration of the orchestrator function which makes it possible to build applications that are natively transportable through the infrastructures.

According to another variant of the invention, the STUDIO function comprises an open shop for developing cognitive applications, said open shop for developing cognitive applications comprising a catalog and application management service and a deep learning user interface.

According to another variant, the STUDIO function provides two functions:

A first, portal function, providing access to the catalog of components, enabling the assembly of components into applications (in the TOSCA standard) and the management of the deployment thereof on various infrastructures, and making it possible to build complex applications in which the model which will serve for the prediction is located;

A second, MMI and FastML engine user interface function, providing a graphical interface providing access to the functions for developing ML/DL models of the FastML engine.

According to another variant, the portal of the STUDIO function (in the TOSCA standard) provides a toolbox for managing, designing, executing and generating applications and test data and comprises:

Two graphical interfaces, one allowing the user to define each application in the TOSCA standard based on the components of the catalog which are brought together by a drag-and-drop action and, for their identification, the user associates to them, via this interface, values and actions defining their life cycle; and the other specific to FastMLE, to the usage of the Data Scientist who wishes to enhance their models, via the API of the orchestrator.

A management menu which makes it possible to manage the deployment of at least one application (in the TOSCA standard) on various infrastructures by offering the different infrastructures (Cloud, Hybrid Cloud, cloud hybrid, HPC, etc.) proposed by the system in the form of a graphical object and by bringing together the infrastructure on which the application will be executed by a drag-and-drop action in one or more "compute" objects defining the choice of the type of computer.

According to another variant, the Forge function comprises pre-trained models stored in memory in the system and accessible to the user by a selection interface, in order to enable transfer learning, use cases for rapid end-to-end development, technological components as well as to set up specific user environments and use cases.

According to another variant, the Forge function comprises a program module which, when executed on a server, makes it possible to create a private workspace shared across a company or a group of accredited users in order to store, share, find and update, in a secure manner (for example after authentication of the users and verification of the access rights (credentials)), component plans, Deep Learning Frameworks, datasets and trained models and forming a warehouse for the analytical components, the models and the datasets.

According to another variant, the Forge function comprises a program module and an MMI interface making it possible to manage a catalog of datasets, and also a catalog of models and a catalog of environments for developing framework models (Fmks) available for the service, thus providing an additional facility to the Data Scientist.

According to another variant, the Forge function proposes a catalog providing access to components:

Of Machine Learning type, such as ML frameworks (e.g. Tensorflow*), but also the models and the datasets;

Of Big Data Analytics type (e.g. Elastic* suite, Hadoop* distribution, etc,) for the datasets;

Development tools (Jupyter*, R*, Python*, etc.);

Data analysis tools;

Statistical tools.

According to another variant, the Forge function is a catalog also providing access to template blueprints.

According to another variant, the operating principle of the orchestrator function performed by a Yorc program module receiving a TOSCA* application as described above (also referred to as topology) is that of allocating physical resources corresponding to the "Compute" component (compute being an abstract computation resource corresponding to a computation size which, after the information has been mapped and based on the configurations, can be a virtual machine, a physical node, etc.), then of installing on this resource software specified in the TOSCA application for this "Compute" component, and of deploying "Docker" containers containing the model training programs and of associating therewith the dataset files mounted via the volumes specified in "Docker Volume" for this "Compute" component.

According to another variant, the deployment of such an application (in the TOSCA standard) by the Yorc orchestrator is carried out using the Slurm plugin of the orchestrator which will trigger the scheduling of one or more slurm jobs, each for a training Ei of a user on a high performance computing (HPC) cluster or on a cloud.

According to another variant, the Yorc orchestrator monitors for each user the available resources of each supercomputer or of each cloud and, when the required resources are available, a supercomputer or cloud node will be allocated (corresponding to the TOSCA Compute component), the container "DockerContainer" will be installed on one or more nodes of this supercomputer, and the volumes corresponding to the input and output data will be mounted in the container (via the "DockerVolume"), then the container will be executed.

According to another variant, the Orchestrator function (orchestrator) proposes, to the user, connectors to manage the applications on different infrastructures, either in Infrastructure as a Service (IaaS) (such as, for example, AWS*, GCP*, Openstack*, etc.) or in Container as a Service (CaaS)

(such as, for example, Kubernetes*), or in High-Performance Computing HPC (such as, for example, Slurm*, PBS*).

The invention also relates to the use of the system according to one of the particular features described above for forming use cases, which will make it possible in particular to enhance the collection of blueprints and of Forge components (catalog): The first use cases identified being:

Cybersecurity, with the use of the AI for Prescriptive SOCs (Security Operations Centers);

Cognitive Data Center (CDC), with the use of the AI for predictive maintenance;

Computer vision, with AI video surveillance applications;

The invention also relates to the use of the system according to one of the particular features described above for utilizing and saving data in an enhanced database that also stores metadata in memory.

The invention further relates to a method for developing, saving, processing, analyzing models and data using the system described above comprising at least one of the following steps:

Creation of a new model developed [I]
Saving the new model developed [II] in the base of the new saved models
Loading the dataset(s) for the training(s) [III]
Loading the new model for the training(s) [IV]
Loading the learning environment (MUDL) [V]
Launching one or more training(s), with deployment and automatic management of the execution by the orchestrator [VI]
Adjusting the new model [VII]
Saving the trained model [VIII]
Deployment on a server of the site of operation of the trained model for inference [IX]
Acquisition by the system, in its operational database, of operational data enhancing the datasets [X] required for improving the quality of the models resulting from the training.

In fact, the model itself (generally code in a container) is stored in the Forge (or catalog), and in the FastMLE metadatabase there is thus the information relating to this model (within an experiment). The trained model forms part of the results (output) of the training and is in a persistent space; currently, it is the user who saves it in the catalog, but only once they consider it to be updated, and not for each training.

PRESENTATION OF THE FIGURES

Other characteristics and benefits of the invention will become apparent upon reading the detailed description of the embodiments of the invention, given solely by way of example and with reference to the drawings, which show.

DETAILED DESCRIPTION OF AN EMBODIMENT OF THE INVENTION

The figures disclose the invention in detail in order to enable it to be carried out. Numerous combinations can be contemplated without departing from the scope of the invention. The embodiments described relate more particularly to an example of implementation of the invention in the context of a system (using a suite of modular and clearly structured tools executable on distributed computing platforms) and to a use of said system for simplifying, improving and optimizing the creation and the use of artificial intelligence applications. However, any implementation in a different context, in particular for any type of data analysis application, is also covered by the present invention.

Figure 2:
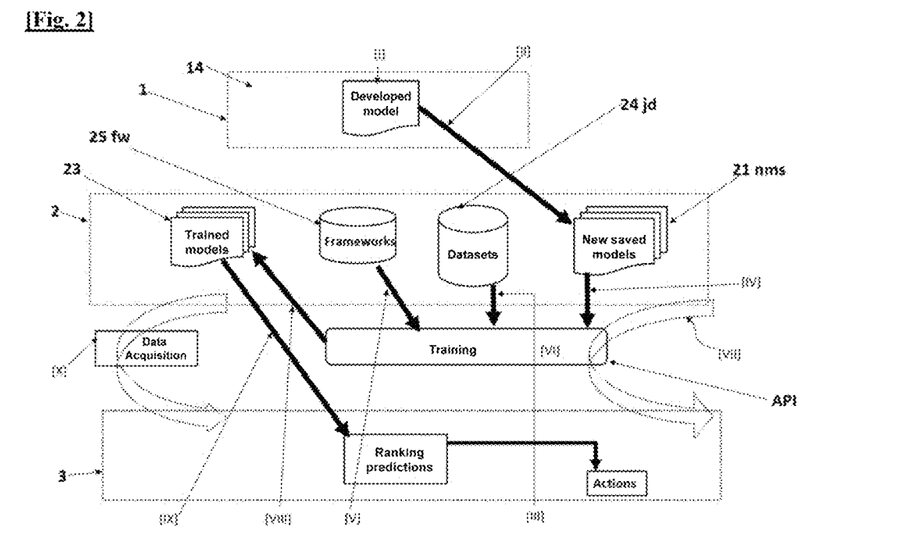
FIG. 2 shows a detailed diagram showing the life cycle of the development of a work tool for a user (for example the Data Scientist).

FIG. 2 is a detailed schematic depiction showing the life cycle of the development of a work tool for a user (for example the Dta Scientist), developing, fine-tuning, and deploying a model and the different interactions between the modules by virtue of the implementation of certain embodiments of the present invention.

The invention also relates to the use of the system according to one of the particular features described above for utilizing and saving data in an enhanced database (49) that also stores in memory the metadata.

The invention further relates to a method for developing, saving, processing, analyzing models and data using the system according to one of the particular features described above, comprising at least one of the steps illustrated by [FIG. 2] and detailed as follows:

Creation of a new model developed [I]
Saving the new model developed [II] in the base (21) of the new saved models The model is generally coded in a container and stored in the Forge (or catalog). In the FastMLE metadatabase, the information relating to this model are available within an experiment.
Loading the dataset(s) for the training(s) [III]
Loading the new model for the training(s) [IV]
Loading the learning environments (ML/DL) [V] (5). These environments (fmks) are specified either at the time the experiment is created or at the time the model is loaded; they are subsequently loaded by the orchestrator at the time the trainings are launched.
Adjusting the new model [VII]. The user can adjust their model based on the results of the training of said model. By successive training launch iterations with different hyperparameters, code modifications, the user can refine this adjustment by adjusting parameters, for example a desired optimal precision of the minimum of the objective function with the test dataset, the convergence time of the algorithm. This adjustment may also be automated with a suitable algorithm.
Saving the trained model [VIII] in the Forge (2). The trained model is part of the results of the training. Since it is available in a persistent space, the user can save it in the catalog of trained models if they are satisfied with the quality of the training results.
Deployment on a server of the site of operation of the trained model for inference [IX].
Acquisition by the system in its operational database of operational data enhancing the datasets (8) required for improving the quality of the models resulting from the training [X].

The user(s) (40) has (have) at least four functions (STUDIO, FORGE, FastMLE and ORCHESTRATION) which contribute to solving a problem that they wish to solve (for example, which model makes it possible to identify spam in a dataset (emails, etc.). Non-limitingly, they have the possibility, in order to achieve their goal, of creating (cre) at least one experiment (43) at least one training (47) by choosing (tel) at least one saved model (21) or, if they wish to re-train an already trained model (23), at least one dataset (24; 24') at least one learning (ML/DL) environment (25).

According to another variant, the user(s) (40) has (have), non-limitingly, the possibility either of developing at least one new model which they save in the base (21) of new saved models, of choosing at least one dataset (24; 24'), at least one learning (ML/DL) environment (25).

According to another variant, the user(s) (40) has (have), non-limitingly, the possibility of submitting at least one model training (47) and of saving the resulting trained model(s) in the base (23) of trained models.

According to another variant, the user(s) (40) has (have), non-limitingly, the possibility of deploying at least one trained model for at least one inference.

According to one variant, the user (40) has, non-limitingly, the possibility of choosing at least one saved (trained) model (23) or a new model (21), several datasets, at least one learning (ML/DL) environment and of submitting at least one training with a particular hyperparameter adjustment.

The orchestrator (3) facilitates and accelerates the process by scheduling, optimizing and automating the execution of the tasks on clusters. The user (40) accesses at least one CPU and at least one GPU and has, inter alia, the possibility of submitting a plurality of trainings and/or of adjusting hyperparameters, etc.

The suite of modular and clearly structured tools executable on distributed computing platforms comprises:
Illustrated by [FIG. 1], a system using a suite of modular and clearly structured Artificial Intelligence application design tools (SOACAIA), executable on distributed computing platforms (cloud, cluster) or undistributed computing platforms (HPC (cluster of thousands of nodes suitable for executing programs in parallel)) to browse, develop, make available and manage AI applications, this set of tools implementing four functions distributed in three functional spaces
A Studio function (1) which makes it possible to create a private shared workspace for the company wherein the extended team of business analysts, data scientists, application architects and IT managers who are accredited on the system by the company can communicate, work together collaboratively, store, share, recover, update the tools which they need for the success of one or more jobs or a project.

Figure 1:
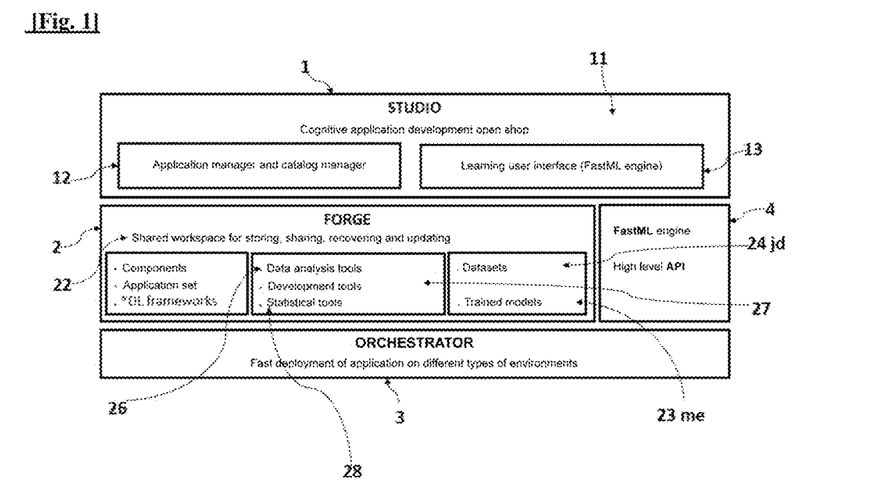
FIG. 1 shows a diagram of the overall architecture of the system using a suite of modular tools according to one embodiment.

In one variant, the users have available to them catalogs of components which they can enhance, in order to exchange them with other users of the workspace (22) and make use thereof to accelerate tests of prototypes and more rapidly validate the models and the concept.

Additionally, in another variant, the Studio function (1) makes it possible to explore, rapidly develop, and also to more easily deploy on several distributed or undistributed computing platforms. The Studio function further makes it possible, by virtue of its interface providing access to the orchestrator (3), to control same. The user sees the catalog of components that the orchestrator is capable of deploying. The Studio function gives a possibility of accelerating the trainings of the models by automating the execution of the jobs, of choosing the infrastructures thereof, of assembling software components and launching the deployment thereof. The quality of the work is not only improved but also facilitated.

According to one variant, the STUDIO function (1) comprises an open shop for developing cognitive applications (11). Said cognitive application development open shop comprises two parts:
The portal, which makes it possible to navigate in the catalog of components, to compose then deploy the applications (assembly of components) referred to as catalog management service and application management service (12), preferably aimed at network and data specialists (data engineers); The MMI, which is a module dedicated to the development of AI models referred to as learning user interface (13), preferably aimed at data scientists.

A variant of the STUDIO function (1) provides a first portal function which provides access to the catalog of components, in order to enable the assembly of components into applications, preferably in the TOSCA standard (Topology & Orchestration Specification for Cloud Application) and manages the deployment thereof on various infrastructures. The TOSCA standard is a standard language known to the person skilled in the art and comprises specifications describing the processes of life cycle management, including creation, start-up, shut-down or modification of services (for example Web services).

A variant of the STUDIO function (1) provides a toolbox for managing, designing, executing and generating application and comprises:
Two graphical interfaces, one allowing the user to define each application in the TOSCA standard based on the components of the catalog which are brought together by a drag-and-drop action for their identification, the user associates, via this interface, values and actions defining their life cycle (for example it is possible to connect a component in a container (DockerContainer) to which it is possible to associate, via this interface, volumes corresponding to input and output data to be processed), preferably reserved for the administrator, and the other for fine-tuning the model(s), preferably reserved for use by the data scientist;
A management menu makes it possible to manage the deployment of at least one application (in the TOSCA standard) on various infrastructures by offering the different infrastructures (Cloud, Hybrid Cloud, cloud hybrid, HPC, etc.) proposed by the system in the form of a graphical object and by bringing together the infrastructure on which the application will be executed by a drag-and-drop action in an object representing "compute" component defining the type of computer. Another action representing/defining the type of compute node (type of computer: represents a physical node or a VM ... to define an abstract computation resource which, once mapped by the orchestrator, becomes a real physical resource used for the deployment).

For this purpose, the application components are dragged into one or more abstract "compute" components, the description of the application thus being independent of the deployment infrastructure. Then, in a second phase of use of this portal, the user matches up (maps) these abstract components (computes) with tangible infrastructures (virtual machines, cloud, physical nodes, etc.).

A variant of the STUDIO function (1) is providing access to a learning engine which makes it possible to manage the model training phases (ML/DL) on different types of resources (for example intensive computation resources, etc.).

Built on the principles of reusing best practices, the Forge function (2) contributes to setting up a highly collaborative workspace, enabling teams of specialist users to work together optimally. Forge is the materialization of the catalog of shareable components.

In one variant, the Forge function (2) provides structured access to a growing repository of analytical components, and makes the analysis models and their associated datasets available to teams of accredited users. This encourages reusing and adapting data for maximum productivity and makes it possible to accelerate production while minimizing costs and risks.

According to one variant, the Forge function (2) is a storage zone, a warehouse for the analytical components, the models (new (21) and trained (23)) and the datasets (24).

In another variant, this Forge function (2) also serves as catalog, providing access to components constituting development Tools (27) (Jupyter*, R*, Python*, etc.), statistical tools (28) (Kibana, ElasticSearch from Elastic stack, etc.), data analysis tools (26) (MySQL, Hadoop, ElasticStack, etc.) or as catalog also providing access to template blueprints Application components (comprising in particular a trained model, but also other applications: topologies ('template') are stored defining a pre-assembly of components that make it possible to speed up deployment: advanced catalog of pre-assembled business applications "blueprint".

In one variant, the Forge function (2) also comprises pre-trained models stored in memory in the system and accessible to the user by a selection interface, in order to enable transfer learning, use cases for rapid end-to-end development, technological components as well as to set up specific user environments and use cases. Transfer learning in the context of this invention consists in the models, once trained by developers, being accessible in a catalog for the reuse thereof by a user on other datasets (example of model recognizing boats which is reused to recognize cars).

In an additional variant, the Forge function (2) comprises a program module which, when executed on a server or a machine, makes it possible to create a private workspace (22) shared across a company or a group of accredited users in order to store, share, recover and update in a secure manner (for example after authentication of the users and verification of the access rights (credentials)), component plans, deep learning frameworks, datasets and trained models and forming a warehouse for the analytical components, the models and the datasets.

In another variant, the Forge function enables all the members of a project team to collaborate on the development of an application. This improves the quality and speed of development of new applications in line with business needs.

A variant of the Forge function (2) further comprises a program module and an MMI interface making it possible to manage a catalog of datasets, and also a catalog of models and a catalog of environments for developing framework models, for example frameworks (Fmks) such as tensorflow, keras, etc., available for the service, thus providing an additional facility to users, preferably to the Data Scientist.

In another variant, the Forge function makes available a new model derived from a previously qualified model.

In another variant, the Forge function makes available to accredited users a catalog providing access to at least one type of components from the components:
Of Machine Learning type, such as ML frameworks (e.g. Tensorflow*), but also the models and the datasets; or
Of Big Data Analytics type (e.g. Elastic* suite, Hadoop* distribution, etc,).

In particular, the Forge function makes it possible to offer not only neural network models but also a catalog of analytical tools.

In one variant, the Forge function makes it possible to industrialize AI components; indeed, it makes it possible to make AI models and their associated datasets available to accredited teams and users. The fine-tuning of a model is carried out on annotated datasets via the functions of the SOACAIA system (in particular the deep learning Engine part); The resulting trained model(s) and the associated annotated dataset(s) is (are) stored in the Forge and are available to users wishing to make use thereof.

The tasks of development and deployment during the deep learning are highly complex. Numerous steps are necessary to the training of models.

Figure 3:
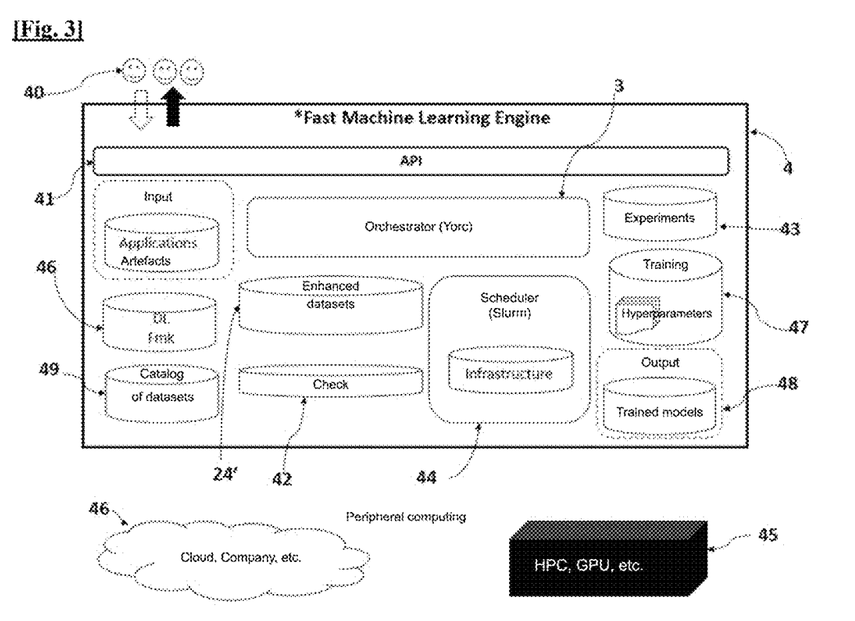
FIG. 3 shows a diagram of the detailed architecture of the FastMLE engine.
Figure 4:
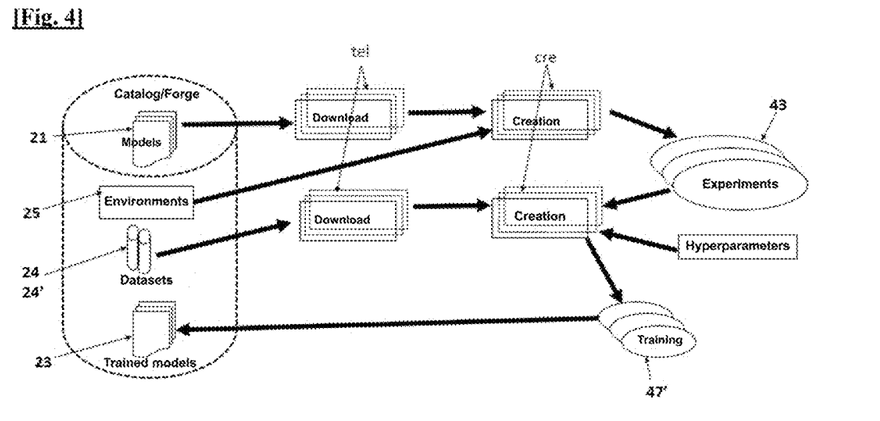
FIG. 4 shows a workflow of development associated with FastMLE and its API.

The user (40) (data scientist, for example) dedicates a lot of time to this. The fast machine learning engine FMLE ("FastML Engine" (4)) function, by the machine learning toolbox thereof, for high-performance computers HPC (45) and hybrid infrastructures (46), masks the complexity of managing tasks by relying on the orchestrator (3) to schedule and automate tasks per batch. Thus, it gives users access to the specific automation tools per batch and to job scheduling.

FastML Engine (4) facilitates the use of computing power and the possibilities of high-performance computing clusters as execution support for machine learning (ML/DL) training models. This is particularly the case for deep learning training models by providing numerous functionalities and tools (for example the datasets required for training models may, when the user wishes so, be loaded from the accredited user's office to the server executing the fast machine learning engine FMLE "FastML Engine" function which can be used for model training, etc.).

By providing these various options, the fast machine learning engine "FastML Engine" simplifies and accelerates processes by enabling users to configure the system in order to launch, using a single configuration operation, a multitude of experiments in parallel on a plurality of selectable AI models (DL, ML model, statistical tools, etc.) with a plurality of selectable datasets.

Thus, the system automatically allocates suitable computation resources for each training (in particular using learning parameters, for instance the number of CPUs/GPUs required, enabling the system to determine how to allocate these resources), which enables the user, a data scientist for example, to save time and concentrate on their main analytical task.

The user may submit several trainings for a model and compare the results resulting from each training.

Moreover, in some embodiments, this comparative analysis of the results of the different models tested during the various trainings can be automated, using automatic monitoring of the results of the models, for example, using statistical tools or other types of trained models for such an examination of the results. Thus, the system will provide an automated (optimized) selection of the best models from the configured experiments and trainings submitted by the users of the Fast MLE engine.

In some embodiments, the fast machine learning engine (FastML Engine) function comprises an API (41) (application programming interface), the aim of which is, during the execution thereof on a platform, to facilitate the design and fine-tuning phase of the machine learning models when a first draft of this model is created; this model must then be trained on one or more annotated datasets in order to be fine-tuned.

In order to train their model, the "data scientist" user must use at least one dataset file comprising annotated data, the FastMLE module making it possible to manage the existing annotated and ready-to-use dataset files; by virtue of this API (41), the "data scientist" can select one or more dataset files and load them to the infrastructure on which the training of their model must be executed.

The high-level API (41) thus facilitates the development of the applications.

Thus, the "FastML Engine" simplifies and accelerates processes by enabling users to configure the system in order to launch, using a single configuration operation, a multitude of experiments in parallel on a plurality of selectable AI models (for example, without limitation, DL, ML models, statistical tools, etc.) with a plurality of selectable datasets. Since FastML makes it possible to process machine learning (ML/DL) but via docker containers, it can be made to execute whatever is desired.

When these AI modules relate to Deep Learning Models (DL), the user has options for managing trainings, models, datasets, environments, resources and inferences. The user may access all the functions of the system either via the high-level API (4) of the FastMLE engine, or via the Studio (1). The high-level API (4) provides the system functions, and the Studio (1) makes them graphically accessible The Orchestrator function (3) gives it the possibility to deploy one or more trainings on suitable resources and the Studio function (1) makes it possible for them to submit, delete, add, or save one or more "jobs" of their choice.

These two functions enable the user (data scientist for example) to automate a set of tasks with low added value for said user by configuring then submitting for example one or a plurality of model trainings.

When these AI modules relate to other types of modeling/simulation/intensive computation tools such as for example statistical tools, data analysis tools, weather simulation tools, crash tests, etc., the user has a set of statistical, analytical, etc., functions that are applicable to the dataset. The user has the possibility, through the MMI providing access to these AI modules, to implement new functions in order to enhance the base available for these statistical, data analysis etc. functions, or to make use thereof. Once the analysis and statistical processing "jobs", etc., have been configured, they can be deployed to the suitable resource(s). The results obtained are saved in the annotated database of Forge (2) and are available to accredited users.

The user has thus available to them a homogeneous high-level API which, during execution thereof, makes it possible to access available sets of tools (environments, models, datasets, etc.), to manage and automate the trainings of these models, to compare the results of the different types of modules on one or more selections of datasets. Thus, while simplifying the job, the API improves the quality of the results and facilitates exchanges.

In any case, it may be possible to compare the results of these different types of modules on the same selection of datasets.

According to a variant of the invention, the fast machine learning engine function comprises an interface enabling the user:

To choose in a menu to create at least one "experiment" EX1, triggering a menu making it possible to associate the code of a model M1, either defined by the user or from the different models Mi stored in memory by the service, with a launch script SLi and with an ML FML j framework (for example Tensorflow, etc.), depending on their choices, to create an association (for example, EX1, M1, SLi, FMLj or EX2, Mi, SLi2 FMLj2 and each association is stored in memory in the FastMLE engine base (24').

In the context of the FastMLE engine, the experiment consists in specifying the different elements (the directory containing the code required to initialize and launch a model training, a script input point (the main script for a training), the environment wherein the training(s) is (are) supported, the data) which will be used for the model training. One or more trainings can be launched using the same element(s) of one or more experiment(s).

To choose in another menu to create and launch a "training" E1 to be executed on their model, by associating an experiment EXk chosen from the experiments in the FastMLE metadatabase (the experiment having been defined (and its script pre-loaded) via Fast MLE. For the moment, the experiments are not really in the forge but in the FastMLE metadatabase) with a dataset DSm (loaded beforehand on the infrastructure via FastMLE), and optionally with hyperparameters depending on the user's choice, the association of EXk and DSm being stored in memory in the FastMLE engine base.

This gives the possibility of accelerating the trainings. The performance (speed of convergence on an effective trained model) and the quality of the result of a training are dependent on the hyperparameters chosen. Hyperparameters (for example, in the case of DL they are: the learning rate, batch size, momentum, weight decay) are algorithm adjustment parameters well-known to a person skilled in the art. The robustness of the algorithms depends thereon. This is a parameter for which the value is defined before starting up the learning, which is used to control the learning process. The correct adjustment of these hyperparameters is generally difficult (in particular due to the vast search space) and decisive for obtaining better model training results in a suitable length of time. The criteria making it possible to do away with adjustment are model precision values which are calculated during the learning (during the model test phase) In practice this adjustment is time-consuming and the user dedicates a significant amount of their time thereto. The system offers the possibility of easily creating/launching a plurality of learnings to monitor, optionally in parallel; by changing the values of the hyperparameters in this way the manual adjustment (tuning) of the latter is facilitated and accelerated. This adjustment of the hyperparameters may also be automatic (by virtue of the orchestrator which will make it possible to deploy a bundle of trainings with a hyperparameter value field) using, non-limitingly, appropriate algorithms for which the accepted convergence criterion is for example the precision sought during the test phase on an annotated dataset.

This gives a significant advantage, making it possible, by launching a multitude of trainings of a model, to adjust the hyperparameters (47) of said model. The user may make use of the elements of an experiment in order to adjoin thereto, via the API of studio (1) or via a command line interface (CLI), additional available parameters such as: ram, gpu, hyperparameters etc., and to launch a training by virtue of FastMLE. The user supervises the training and has the possibility of saving at least the trained model resulting therefrom in the FastMLE base of trained models (48).

The accredited user thus has the possibility, by navigating on their terminal through the various available options (creation, editing, display, save, delete, etc.) to choose, or to make available to other users, either datasets (43) or trained models (48) or experiments or "learning models", or ML/DL environments (46), and thus to optimize the effectiveness and quality of the results.

According to another variant, the fast machine learning engine function enables a container to be executed on a high-performance cluster having CPU, RAM, GPU resources as mentioned by the data scientist. The software resources necessary for executing a job are found in the containers. The container is created when a training is launched, based on information belonging to the experiment(s) and information provided at the time the training is created. This information (for example the information of knowing where a dataset is located, not the dataset itself, the information that an experiment is using a particular Docker container, not the image of the container itself, etc.), which is FastMLE metadata, is stored in memory in a database. It is the container that will be deployed on the nodes of the execution infrastructure (physical node, virtual machine, etc.).

The containers make it possible to solve the problems of reliability and portability of software when they are moved from one computing environment to another. At least one advantage of this technique is to render abstract the various differences existing in the infrastructures, the distributions, etc.

According to another variant, the fast machine learning engine function contains another FastMLE interface which enables the user to supervise the training thereof (42), monitor the evolution thereof (initialization, ongoing, ended, etc.) and monitor it.

According to another variant, the FMLE engine requires:
A scheduler (44) which manages all the resources on the group of machines to make it possible to allocate resources to one or more jobs; A container management system (container) used to support the deep learning experiments and thus secure the execution thereof, in order for them to be accessible only by the user or group or company;
A warehouse (46) to save the container images of the deep learning environments (frameworks) which are used to launch the experiments EX;
An NFS distributed file system (47) for sharing the dataset files between the deep learning experiments.

According to another variant, the fast machine learning engine function associated in a system, preferably the system (SOACAIA) described above, using the functionalities of the orchestrator, preferably Yorc, will make it possible to generate at least one HPC job to enable the execution of each training of each model.

The association of FastMLE and Yorc makes it possible inter alia to conceal from the user complex jobs consisting in defining their execution program, allocating the resources required, deploying the training thereon and launching it.

The FastMLE engine offers the possibility of automatically installing the components (Slurm, Docker, Docker registry, distributed file system, etc.) required for the use thereof, as long as they are compatible. These components make it possible, inter alia, to manage the deployment on the compute nodes, to manage the Docker containers, to share certain files between the nodes. The main user can access all the compute nodes via secure connection (preferably of SSH type, well-known to a person skilled in the art), each compute node being able to be accessible (SSH connection) by the user having the identifier of the compute node and the corresponding password.

The use of the Orchestrator function (3), which manages the total implementation of the AI instances designed by using the STUDIO function and industrialized by the Forge function, carries out the permanent management of the life cycle on a hybrid cloud infrastructure.

In another variant, the orchestrator (3) allocates resources, deploys jobs and launches the execution thereof.

The fine-tuning of a model requires significant computing resources. The use of the orchestrator to deploy the training job (for example on a supercomputer) is of major importance to simplify the user's task.

In one variant, the orchestrator (3) deploys the model(s) developed and/or chosen (from the base of available models) for training(s).

According to one variant, the Yorc orchestrator may monitor the available resources of the supercomputer or of the cloud and, when the required resources are available, a supercomputer or cloud node is allocated (corresponding to the TOSCA Compute); in the case of use by FastMLE, it relies on Slurm which takes on and performs this by itself. The container (Dockercontainer) is installed by the orchestrator in this supercomputer or on this node and the volumes corresponding to the input and output data (DockerVolume) are mounted, then the container is executed.

According to another variant, the orchestrator makes it possible to model (in TOSCA) and manage the deployment of applications in the form of Docker containers; when these applications need to access data, it is possible to model in TOSCA a DockerVolume which will make it possible to mount a volume that provides access to this data from the container which will be deployed.

According to another variant, these DockerVolumes are used in the case of the DL applications (trainings), which makes it possible to access the datasets.

In another variant, the orchestrator (3) is controlled directly via the open shop for developing cognitive applications of Studio (11). Here, the user has access to the catalog of components of the orchestrator and is able to deploy them. They may thus pick what they want as component, assemble them, choose the infrastructures and launch their deployment.

In another variant, the control described above is concealed from the user by FastMLE (4). It is FastMLE (4) which controls the orchestrator without going via the interface for developing cognitive applications of Studio (11). Here, the user simply specifies what they need (for example CPU, GPU, memory, etc.) depending on the type of model (ML, DL) they wish to train. The orchestrator via FastMLE allocates the necessary resources, and provides the deployment and execution of the training. Nevertheless, the system still enables the user (administrator, preferably) to take control (directly control) via the Studio interface (11).

In another variant, the orchestrator (3) deploys the trained model(s) for inference.

In another variant, the orchestrator (3) deploys the model(s) fine-tuned in production.

According to a variant, the operating principle of the Orchestrator function performed by a Yorc program module receiving an application for example in the TOSCA* standard (topology) is:
The allocation of physical resources of the Cloud or an HPC corresponding to the Compute component(s) (depending on the configurations this may be a virtual machine, a physical node, etc.),
The installation, on these resources, of software specified in the TOSCA application for this (these) "Compute" component(s), here, in the case of an FMLE application, a Docker container, and in our case mounting the specified volumes for this Compute.

In the case of a FastMLE application, its TOSCA modeling generated by FastMLE will describe a Docker container on which volumes are mounted which correspond to the dataset(s) necessary for the training and to the outputs (results).

In one variant, the deployment of such an application (in the TOSCA standard) by the Yorc orchestrator is performed using the Slurm plugin (resource allocation management tool specific to HPC systems . . . on IBM, this will be an LSF plugin) of the orchestrator, which will trigger the scheduling of a slurm job on a high-performance computing (HPC) cluster. Whereas, for deployment on a cloud, Kubernetes or other specific tools for deploying application containers in Cloud environments are used. Thus, the orchestrator is flexible and hence upgradeable, since it is possible to change the plugin based on the environment/infrastructure on which deployment is desired.

The key characteristic of the orchestrator for being able to deploy and launch ML trainings is job support, to be able to launch "batch" type processings (typical of trainings that are launched on HPC clusters, but also of any HPC batch as simulation, etc.), this function is coupled to a SLURM plugin of the orchestrator, which makes it possible to convert these "jobs" into SLURM tasks (one of the known HPC resource schedulers).

In another variant, the Orchestrator function (orchestrator) proposes, to the user, connectors to manage the applications on different infrastructures, either in Infrastructure as a Service (IaaS) (such as, for example, AWS*, GCP*, Openstack*, etc.) or in Container as a Service (CaaS) (such as, for example, Kubernetes*), or in High-Performance Computing HPC (such as, for example, Slurm*, PBS*).

The invention also relates to the use of the system (S) according to one of the particular features described above, with the trained models thereof and the annotated datasets thereof, in particular for learning transfer, for the suitable allocation of resources and for the execution of one or more jobs as described.

The invention also relates to the use of the System implementing a suite of modular and clearly structured tools (SOACAIA), with the trained models thereof and the annotated datasets thereof, according to one of the particular features described above, as a location of resources for users. Said location of resources defining the various save and store zones (for example models, frameworks, data, etc.) available and facilitating cooperation between different users accelerates productivity and the efficiency of each of said users. This enables users to benefit from the consequent time saving and to entirely dedicate themselves to their main jobs.

FIG. 1 schematically shows the architecture of the modules and in combination with [FIG. 2] an example of use of the system by a data scientist. In this example, the user accesses their secure private space by exchanging, via the Studio interface (14, [FIG. 2]), their accreditation information, then they select at least one model (21), at least one framework (25), at least one dataset (24) and optionally a trained model (23). Via the MMI (13, [FIG. 1]), the user submits a job for training the selected model (21 or 23) with a framework and the dataset selected on an infrastructure configured via the orchestrator, the resulting trained model can be stored in the forge (23, [FIG. 1]) and/then deployed in production in an AI application (3, [FIG. 2]).

The deployment of the model on a server or a machine is carried out by the orchestrator (3, [FIG. 1]) which also manages the training. In a final step, the trained model is saved in Forge (2) and enhances the catalog of trained models (23).

The annotated datasets available are an important and valuable resource for validating and training models.

According to one variant, FastMLE can be used to create and enhance the catalog with pre-trained models and associated annotated datasets in various domains. For example, in the fields of cybersecurity, where upstream detection of all the phases preceding a targeted attack is a crucial problem. The availability, large amounts of data (Big data) make it possible currently to contemplate a preventative approach for attack detection. The use of AI for Prescriptive SOCs (prescriptive Security Operations Center) provides solutions. With the collection and processing of data originating from different sources (external and internal), a base is fed (pre-trained models and associated datasets). Machine Learning and data visualization processes then make it possible to carry out behavioral analysis and predictive inference in SOCs.

In another example, the field of CDC, which is an intelligent and autonomous data center capable of receiving and analyzing data from the network, servers, applications, cooling and energy consumption systems, the use of the system (SOACAIA) enables an application to be built that provides real-time analysis of all events, providing interpretation graphs with predictions using a confidence indicator regarding possible failures and elements that will potentially be impacted. The system (SOACAIA) makes it possible to optimize the availability and performance of the applications and infrastructures.

In yet another example, the fields of computer vision and video surveillance, the system (SOACAIA), via the Forge component, makes available the latest image analysis technologies and provides a video intelligence application capable of extracting features from faces, vehicles, bags and other objects and provides powerful services for facial recognition, crowd movement tracking, people search based on given features, license plate recognition, inter alia.

It will be understood from the present application that various embodiments anticipate and aim to protect a system for monitoring (learning and dataset engine management) and orchestration (i.e. optimized resource allocation) for the execution of multiple trainings in parallel on various learning (Machine Learning and/or Deep Learning) engines with various datasets in order to train several engines and accelerate obtaining a selection of the best-performing engines for each type of dataset (potential monitoring of the selections obtained in order to improve the management of subsequent monitoring).

The present application describes various technical features and advantages with reference to the figures and/or various embodiments. A person skilled in the art will understand that the technical features of a given embodiment may in fact be combined with features of another embodiment unless the opposite is explicitly mentioned or it is obvious that these features are incompatible or that the combination does not provide a solution to at least one of the technical problems mentioned in the present application. In addition, the technical features described in a given embodiment may be isolated from the other features of this mode unless the opposite is explicitly stated.

It should be obvious for a person skilled in the art that the present invention allows embodiments in many other specific forms without departing from the scope of the invention as claimed. Therefore, the present embodiments should be considered to be provided for purposes of illustration, but may be modified within the range defined by the scope of the attached claims, and the invention should not be limited to the details provided above.

The invention claimed is:

1. A system using a suite of modular and clearly structured Artificial Intelligence application design tools (SOACAIA), executable on computing platforms or hybrid infrastructures to browse, develop, make available and manage Artificial Intelligence (AI) applications, this set of tools implementing four functions:

a Studio function making it possible to establish a secure and private shared space for the company wherein the extended team of business analysts, data scientists, application architects and Information Technology (IT) managers can communicate and work together collaboratively;

a Forge function making it possible to industrialize AI instances and make analytical models and their associated datasets available, via a catalog, to the development teams, subject to compliance with security and processing conformity conditions;

an Orchestrator function for managing the total implementation of the AI instances designed by the STUDIO function and industrialized by the Forge function and to perform permanent management on a hybrid cloud infrastructure;

a fast machine learning engine (FMLE) function, which is a machine learning toolbox for high-performance computers HPC and hybrid infrastructures, facilitating the use of computing power and the possibilities of high-performance computing clusters as execution support for machine learning training models and specifically deep learning training models;

wherein the STUDIO function provides two functions:
  a first, portal function, providing access to the catalog of components, enabling the assembly of components into applications (in the TOSCA standard) and making it possible to manage the deployment thereof on various infrastructures;
  a second, MMI and FastML engine user interface function, providing a graphical interface providing access to the functions for developing ML/DL models of the FastML engine; and wherein the portal of the STUDIO function provides a toolbox (based on the TOSCA standard) for managing, designing, executing and generating applications and test data and comprises:
  two graphical interfaces, one allowing the user to define each application in the TOSCA standard based on the components of the catalog which are brought together by a drag- and-drop action and, for their identification, the user associates to them, via this interface, values and actions defining their life cycle; and the other for the fine-tuning of the ML/DL model(s); and
  a management menu which makes it possible to manage the deployment of at least one application (in the TOSCA standard) on various infrastructures by offering the different infrastructures (Cloud, Hybrid Cloud, cloud hybrid, HPC) proposed by the system in the form of a graphical object and by associating the infrastructure on which the application will be executed by a drag-and-drop action in one or more "compute" objects defining the choice of the type of computer.

2. The system according to claim 1, wherein by using functionalities of a Yorc orchestrator, the fast machine learning engine function makes it possible to generate at least one HPC job to enable the execution of each training of each model.

3. The system according to claim 1, wherein AI applications are made independent of the support infrastructures by a TOSCA-based orchestration of the ORCHESTRATOR function which makes it possible to build applications that are natively transportable through the infrastructures.

4. The system according to claim 1, wherein the STUDIO function comprises an open shop for developing cognitive applications comprising a catalog and application management service and a deep learning user interface.

5. The system according to claim 1, wherein the Forge function comprises pre-trained models stored in memory in the system and accessible to the user by a selection interface, in order to enable transfer learning, use cases for rapid end-to-end development, technological components as well as to set up specific user environments and use cases.

6. The system according to claim 1, wherein the Forge function further comprises a program module which, when executed on a server, makes it possible to create a private workspace shared across a company or a group of accredited users in order to store, share, find and update, in a secure manner, component plans, deep learning frameworks, datasets and trained models and forming a warehouse for the analytical components, the models and the datasets.

7. The system according to claim 1, wherein the Forge function further comprises a program module and a man-machine interface MMI making it possible to manage a catalog of datasets, and also a catalog of models and a catalog of environments for developing framework (Fmks) models available for the service, thus providing an additional facility to the Data Scientist.

8. The system according to claim 1, wherein the Forge function further includes a catalog providing access to at least one type of components from the following components:
  of machine learning (ML) type including the models and the datasets;
  of Big Data Analytics type for the datasets;
  of development tools;
  of data analysis tools type;
  of statistical tools type.

9. The system according to claim 1, wherein the Forge function further includes a catalog also providing access to template blueprints.

10. The system according to claim 1, wherein the operating principle of the orchestrator function performed by a Yorc program module receiving a TOSCA* application is that of allocating physical resources corresponding to the "Compute" component which, based on the configurations, may be a virtual machine or a physical node, then of installing, on this resource, software specified in the TOSCA application for this "Compute" component, and of deploying "Docker" containers containing the model training programs and of associating therewith the dataset files mounted via the volumes specified in (Docker Volume) for this "Compute" component.

11. The system according to claim 1, wherein the deployment of such an application (in the TOSCA standard) by the Yorc orchestrator is carried out using the Slurm plugin of the orchestrator which triggers the scheduling of a slurm job on a high performance computing (HPC) cluster.

12. The system according to claim 1, wherein the Yorc orchestrator monitors, for each user, the available resources of each supercomputer or of each cloud and, when the required resources are available, a supercomputer or cloud node is allocated (corresponding to the TOSCA Compute), the container (DockerContainer) is installed on one or more nodes of this supercomputer, and the volumes corresponding to the input and output data (DockerVolume) is mounted, then the container is executed.

13. The system according to claim 1, wherein the Orchestrator function (orchestrator) proposes, to the user, connectors to manage applications on different infrastructures, either in Infrastructure as a Service (IaaS), or in Container as a Service (CaaS), or in High-Performance Computing HPC.

14. The system according to claim 1, wherein the FastMLE function utilizes and saves data in an enhanced database also storing the metadata in memory.

15. A use of the system-according to claim 1, for forming use cases, which makes it possible in particular to enhance the collection of blueprints and of Forge components (catalog), the first use cases identified being:
cybersecurity, with the use of the AI for Prescriptive SOCs;
cognitive Data Center (CDC), with the use of the AI for predictive maintenance;
computer vision, with AI video surveillance applications.

16. A method for developing, saving, processing, analyzing models and data using the System according to claim 1, comprising at least one of the following steps:
creation of a new model developed;
saving the new model developed in the base of the new saved models;
loading the dataset(s) for the training(s);
loading the new model for the training(s);
loading the learning environment (ML/DL);
launching one or more trainings, with deployment and automatic management of the execution by the orchestrator;
adjusting the new model;
saving the trained model;
deployment on a server of the site of operation of the trained model for inference;
acquisition by the system, in its operational database, of operational data enhancing the datasets required for improving the quality of the models resulting from the training.

17. A fast machine learning engine (FastMLE) function comprising an interface, the aim of which is, during its execution on a platform, to facilitate the phase of designing and fine-tuning machine learning models when a first draft of this model is produced and to train on one or more annotated dataset(s) in order to fine-tune the model, the FastMLE module making it possible to manage the existing annotated and ready-to-use dataset files, by enabling the selection of one or more dataset files by the "data scientist" and loading them onto an infrastructure where the training of their model is to be executed, or to save them in at least one database operated by FastMLE;
wherein the interface of the fast machine learning engine function enables the user:
to choose in a menu to create at least one "experiment" EX1, triggering a menu making it possible to associate the code of a model M1, either defined by the user or from the different models Mi stored in memory by the service, with a launch script SLi and with an ML FMLj framework and, depending on the choices, to create an association each of which is stored in memory in the FastMLE metadatabase, each of these items of information generating the creation of a respective container (EX1, EX2) when the user launches a training; or
to choose in another menu to create and launch a "training" E1 to be executed on their model, by associating an experiment EXk chosen from the previously created experiments, of the Forge catalog, with a dataset DSm (previously loaded on the infrastructure via FastMLE) and optionally with hyperparameters depending on the user's choices, the association EXk, DSm being materialized in a container, the information of the association being stored in memory in the FastMLE metadata.

18. The fast machine learning engine function according to claim 17, wherein a container is executed on a high-performance cluster having CPU, RAM, GPU resources as chosen by the data scientist in the FastMLE use.

19. The fast machine learning engine function according to claim 17, wherein another FastMLE interface enables the user to supervise the training thereof, monitor the evolution thereof (initialization, ongoing, ended, etc.) and monitor the training.

20. The fast machine learning engine function according to claim 17, wherein the FastMLE engine requires:
a scheduler which manages all the resources on the group of machines to make it possible to allocate resources to one or more jobs;
a container management system used to support the machine learning experiments and thus secure the execution thereof, in order for them to be accessible only by the user or group or company;
a warehouse to save the container images of the deep learning environments (frameworks) which are used to launch the experiments EX;
an NFS distributed file system for sharing the dataset files between the machine learning experiments.

21. A system using a suite of modular and clearly structured Artificial Intelligence application design tools (SOACAIA), executable on computing platforms or hybrid infrastructures to browse, develop, make available and manage Artificial Intelligence (AI) applications, this set of tools implementing four functions:
a Studio function making it possible to establish a secure and private shared space for the company wherein the extended team of business analysts, data scientists, application architects and Information Technology (IT) managers can communicate and work together collaboratively;
a Forge function making it possible to industrialize AI instances and make analytical models and their associated datasets available, via a catalog, to the development teams, subject to compliance with security and processing conformity conditions;
an Orchestrator function for managing the total implementation of the AI instances designed by the STUDIO function and industrialized by the Forge function and to perform permanent management on a hybrid cloud infrastructure;
a fast machine learning engine (FMLE) function, which is a machine learning toolbox for high-performance computers HPC and hybrid infrastructures, facilitating the use of computing power and the possibilities of high-performance computing clusters as execution support for machine learning training models and specifically deep learning training models;
wherein the operating principle of the orchestrator function performed by a Yorc program module receiving a TOSCA* application is that of allocating physical resources corresponding to the "Compute" component which, based on the configurations, may be a virtual machine or a physical node, then of installing, on this resource, software specified in the TOSCA application for this "Compute" component, and of deploying "Docker" containers containing the model training programs and of associating therewith the dataset files mounted via the volumes specified in (Docker Volume) for this "Compute" component.

22. The system according to claim 21, wherein by using functionalities of a Yorc orchestrator, the fast machine learning engine function makes it possible to generate at least one HPC job to enable the execution of each training of each model.

23. The system according to claim 21, wherein AI applications are made independent of the support infrastructures by a TOSCA-based orchestration of the ORCHESTRATOR function which makes it possible to build applications that are natively transportable through the infrastructures.

24. The system according to claim 21, wherein the STUDIO function comprises an open shop for developing cognitive applications comprising a catalog and application management service and a deep learning user interface.

25. The system according to claim 21, wherein the Forge function comprises pre-trained models stored in memory in the system and accessible to the user by a selection interface, in order to enable transfer learning, use cases for rapid end-to-end development, technological components as well as to set up specific user environments and use cases.

26. The system according to claim 21, wherein the Forge function further comprises a program module which, when executed on a server, makes it possible to create a private workspace shared across a company or a group of accredited users in order to store, share, find and update, in a secure manner, component plans, deep learning frameworks, datasets and trained models and forming a warehouse for the analytical components, the models and the datasets.

27. The system according to claim 21, wherein the Forge function further comprises a program module and a man-machine interface MIMI making it possible to manage a catalog of datasets, and also a catalog of models and a catalog of environments for developing framework (Fmks) models available for the service, thus providing an additional facility to the Data Scientist.

28. The system according to claim 21, wherein the Forge function further includes a catalog providing access to at least one type of components from the following components:
    of machine learning (ML) type including the models and the datasets;
    of Big Data Analytics type for the datasets;
    of development tools;
    of data analysis tools type;
    of statistical tools type.

29. The system according to claim 21, wherein the Forge function further includes a catalog also providing access to template blueprints.

30. The system according to claim 21, wherein the deployment of such an application (in the TOSCA standard) by the Yorc orchestrator is carried out using the Slurm plugin of the orchestrator which triggers the scheduling of a slurm job on a high performance computing (HPC) cluster.

31. The system according to claim 21, wherein the Yorc orchestrator monitors, for each user, the available resources of each supercomputer or of each cloud and, when the required resources are available, a supercomputer or cloud node is allocated (corresponding to the TOSCA Compute), the container (DockerContainer) is installed on one or more nodes of this supercomputer, and the volumes corresponding to the input and output data (DockerVolume) is mounted, then the container is executed.

32. The system according to claim 21, wherein the Orchestrator function (orchestrator) proposes, to the user, connectors to manage applications on different infrastructures, either in Infrastructure as a Service (IaaS), or in Container as a Service (CaaS), or in High-Performance Computing HPC.

33. The system according to claim 21, wherein the FastMLE function utilizes and saves data in an enhanced database also storing the metadata in memory.

34. A use of the system according to claim 21, for forming use cases, which makes it possible in particular to enhance the collection of blueprints and of Forge components (catalog), the first use cases identified being:

cybersecurity, with the use of the AI for Prescriptive SOCs;
cognitive Data Center (CDC), with the use of the AI for predictive maintenance;
computer vision, with AI video surveillance applications.

35. A method for developing, saving, processing, analyzing models and data using the system according to claim 21, comprising at least one of the following steps:
    creation of a new model developed;
    saving the new model developed in the base of the new saved models;
    loading the dataset(s) for the training(s);
    loading the new model for the training(s);
    loading the learning environment (ML/DL);
    launching one or more trainings, with deployment and automatic management of the execution by the orchestrator;
    adjusting the new model;
    saving the trained model;
    deployment on a server of the site of operation of the trained model for inference;
    acquisition by the system, in its operational database, of operational data enhancing the datasets required for improving the quality of the models resulting from the training.

36. A system using a suite of modular and clearly structured Artificial Intelligence application design tools (SOACAIA), executable on computing platforms or hybrid infrastructures to browse, develop, make available and manage Artificial Intelligence (AI) applications, this set of tools implementing four functions:
    a Studio function making it possible to establish a secure and private shared space for the company wherein the extended team of business analysts, data scientists, application architects and Information Technology (IT) managers can communicate and work together collaboratively;
    a Forge function making it possible to industrialize AI instances and make analytical models and their associated datasets available, via a catalog, to the development teams, subject to compliance with security and processing conformity conditions;
    an Orchestrator function for managing the total implementation of the AI instances designed by the STUDIO function and industrialized by the Forge function and to perform permanent management on a hybrid cloud infrastructure;
    a fast machine learning engine (FMLE) function, which is a machine learning toolbox for high-performance computers HPC and hybrid infrastructures, facilitating the use of computing power and the possibilities of high-performance computing clusters as execution support for machine learning training models and specifically deep learning training models;
    wherein the deployment of such an application (in the TOSCA standard) by a Yorc orchestrator is carried out using the Slurm plugin of the orchestrator which triggers the scheduling of a slurm job on a high performance computing (HPC) cluster.

37. The system according to claim 36, wherein by using functionalities of the Yorc orchestrator, the fast machine learning engine function makes it possible to generate at least one HPC job to enable the execution of each training of each model.

38. The system according to claim 36, wherein AI applications are made independent of the support infrastructures by a TOSCA-based orchestration of the ORCHESTRATOR function which makes it possible to build applications that are natively transportable through the infrastructures.

39. The system according to claim 36, wherein the STUDIO function comprises an open shop for developing cognitive applications comprising a catalog and application management service and a deep learning user interface.

40. The system according to claim 36, wherein the Forge function comprises pre-trained models stored in memory in the system and accessible to the user by a selection interface, in order to enable transfer learning, use cases for rapid end-to-end development, technological components as well as to set up specific user environments and use cases.

41. The system according to claim 36, wherein the Forge function further comprises a program module which, when executed on a server, makes it possible to create a private workspace shared across a company or a group of accredited users in order to store, share, find and update, in a secure manner, component plans, deep learning frameworks, datasets and trained models and forming a warehouse for the analytical components, the models and the datasets.

42. The system according to claim 36, wherein the Forge function further comprises a program module and a man-machine interface MMI making it possible to manage a catalog of datasets, and also a catalog of models and a catalog of environments for developing framework (Fmks) models available for the service, thus providing an additional facility to the Data Scientist.

43. The system according to claim 36, wherein the Forge function further includes a catalog providing access to at least one type of components from the following components:
   of machine learning (ML) type including the models and the datasets;
   of Big Data Analytics type for the datasets;
   of development tools;
   of data analysis tools type;
   of statistical tools type.

44. The system according to claim 36, wherein the Forge function further includes a catalog also providing access to template blueprints.

45. The system according to claim 36, wherein the Yorc orchestrator monitors, for each user, the available resources of each supercomputer or of each cloud and, when the required resources are available, a supercomputer or cloud node is allocated (corresponding to the TOSCA Compute), the container (DockerContainer) is installed on one or more nodes of this supercomputer, and the volumes corresponding to the input and output data (DockerVolume) is mounted, then the container is executed.

46. The system according to claim 36, wherein the Orchestrator function (orchestrator) proposes, to the user, connectors to manage applications on different infrastructures, either in Infrastructure as a Service (IaaS), or in Container as a Service (CaaS), or in High-Performance Computing HPC.

47. The system according to claim 36, wherein the FastMLE function utilizes and saves data in an enhanced database also storing the metadata in memory.

48. A use of the system according to claim 36, for forming use cases, which makes it possible in particular to enhance the collection of blueprints and of Forge components (catalog), the first use cases identified being:
   cybersecurity, with the use of the AI for Prescriptive SOCs;
   cognitive Data Center (CDC), with the use of the AI for predictive maintenance;
   computer vision, with AI video surveillance applications.

49. A method for developing, saving, processing, analyzing models and data using the system according to claim 36, comprising at least one of the following steps:
   creation of a new model developed;
   saving the new model developed in the base of the new saved models;
   loading the dataset(s) for the training(s);
   loading the new model for the training(s);
   loading the learning environment (ML/DL);
   launching one or more trainings, with deployment and automatic management of the execution by the orchestrator;
   adjusting the new model;
   saving the trained model;
   deployment on a server of the site of operation of the trained model for inference;
   acquisition by the system, in its operational database, of operational data enhancing the datasets required for improving the quality of the models resulting from the training.

50. A system using a suite of modular and clearly structured Artificial Intelligence application design tools (SOACAIA), executable on computing platforms or hybrid infrastructures to browse, develop, make available and manage Artificial Intelligence (AI) applications, this set of tools implementing four functions:
   a Studio function making it possible to establish a secure and private shared space for the company wherein the extended team of business analysts, data scientists, application architects and Information Technology (IT) managers can communicate and work together collaboratively;
   a Forge function making it possible to industrialize AI instances and make analytical models and their associated datasets available, via a catalog, to the development teams, subject to compliance with security and processing conformity conditions;
   an Orchestrator function for managing the total implementation of the AI instances designed by the STUDIO function and industrialized by the Forge function and to perform permanent management on a hybrid cloud infrastructure;
   a fast machine learning engine (FMLE) function, which is a machine learning toolbox for high-performance computers HPC and hybrid infrastructures, facilitating the use of computing power and the possibilities of high-performance computing clusters as execution support for machine learning training models and specifically deep learning training models;
   wherein a Yorc orchestrator monitors, for each user, the available resources of each supercomputer or of each cloud and, when the required resources are available, a supercomputer or cloud node is allocated (corresponding to the TOSCA Compute), the container (DockerContainer) is installed on one or more nodes of this supercomputer, and the volumes corresponding to the input and output data (DockerVolume) is mounted, then the container is executed.

51. The system according to claim 50, wherein by using functionalities of the Yorc orchestrator, the fast machine learning engine function makes it possible to generate at least one HPC job to enable the execution of each training of each model.

52. The system according to claim 50, wherein AI applications are made independent of the support infrastructures by a TOSCA-based orchestration of the ORCHESTRATOR function which makes it possible to build applications that are natively transportable through the infrastructures.

53. The system according to claim 50, wherein the STUDIO function comprises an open shop for developing cognitive applications comprising a catalog and application management service and a deep learning user interface.

54. The system according to claim 50, wherein the Forge function comprises pre-trained models stored in memory in the system and accessible to the user by a selection interface, in order to enable transfer learning, use cases for rapid end-to-end development, technological components as well as to set up specific user environments and use cases.

55. The system according to claim 50, wherein the Forge function further comprises a program module which, when executed on a server, makes it possible to create a private workspace shared across a company or a group of accredited users in order to store, share, find and update, in a secure manner, component plans, deep learning frameworks, datasets and trained models and forming a warehouse for the analytical components, the models and the datasets.

56. The system according to claim 50, wherein the Forge function further comprises a program module and a man-machine interface MMI making it possible to manage a catalog of datasets, and also a catalog of models and a catalog of environments for developing framework (Fmks) models available for the service, thus providing an additional facility to the Data Scientist.

57. The system according to claim 50, wherein the Forge function further includes a catalog providing access to at least one type of components from the following components:
- of machine learning (ML) type including the models and the datasets;
- of Big Data Analytics type for the datasets;
- of development tools;
- of data analysis tools type;
- of statistical tools type.

58. The system according to claim 50, wherein the Forge function further includes a catalog also providing access to template blueprints.

59. The system according to claim 50, wherein the Orchestrator function (orchestrator) proposes, to the user, connectors to manage applications on different infrastructures, either in Infrastructure as a Service (IaaS), or in Container as a Service (CaaS), or in High-Performance Computing HPC.

60. The system according to claim 50, wherein the FastMLE function utilizes and saves data in an enhanced database also storing the metadata in memory.

61. A use of the system according to claim 50, for forming use cases, which makes it possible in particular to enhance the collection of blueprints and of Forge components (catalog), the first use cases identified being:
- cybersecurity, with the use of the AI for Prescriptive SOCs;
- cognitive Data Center (CDC), with the use of the AI for predictive maintenance;
- computer vision, with AI video surveillance applications.

62. A method for developing, saving, processing, analyzing models and data using the system according to claim 50, comprising at least one of the following steps:
- creation of a new model developed;
- saving the new model developed in the base of the new saved models;
- loading the dataset(s) for the training(s);
- loading the new model for the training(s);
- loading the learning environment (ML/DL);
- launching one or more trainings, with deployment and automatic management of the execution by the orchestrator;
- adjusting the new model;
- saving the trained model;
- deployment on a server of the site of operation of the trained model for inference;
- acquisition by the system, in its operational database, of operational data enhancing the datasets required for improving the quality of the models resulting from the training.

* * * * *